United States Patent [19]
Estberg et al.

[11] Patent Number: 6,148,337
[45] Date of Patent: Nov. 14, 2000

[54] METHOD AND SYSTEM FOR MONITORING AND MANIPULATING THE FLOW OF PRIVATE INFORMATION ON PUBLIC NETWORKS

[75] Inventors: Donald G. Estberg, Bellevue; David M. Olafson, Federal Way, both of Wash.

[73] Assignee: Bridgeway Corporation, Redmond, Wash.

[21] Appl. No.: 09/053,830

[22] Filed: Apr. 1, 1998

[51] Int. Cl.$^7$ .................................................. G06F 13/00
[52] U.S. Cl. ........................... 709/224; 709/223; 709/238
[58] Field of Search ..................................... 709/218, 220, 709/223, 224, 227, 230, 238, 242, 243, 244, 249, 250, 300; 370/362, 363, 395, 401

[56] References Cited

U.S. PATENT DOCUMENTS

| | | | |
|---|---|---|---|
| 5,432,785 | 7/1995 | Ahmed et al. | 370/231 |
| 5,652,787 | 7/1997 | O'Kelly | 379/112 |
| 5,713,075 | 1/1998 | Threadgill et al. | 455/427 |
| 5,781,549 | 7/1998 | Dai | 370/398 |
| 5,818,921 | 10/1998 | Meiden et al. | 379/225 |
| 5,898,784 | 4/1999 | Kirby et al. | 380/49 |

OTHER PUBLICATIONS

Boardman, Bruce, "Monitoring the Vital Signs of your Network," Network Computing, Jan. 15, 1997, pp. 1–4.

Duffy, Jim, "MAXM unveils new version of net management system," Network World, Oct. 18, 1995, p. 18.

Huntington–Lee, Jill and Allen Thomas, "Delivering Service to a Major ISP and its Customers with Micromuse Netcool Service–Level Management," May 1997, pp. 1–9.

"About OSI," http://www.osi.com/Investor/ShareHolder/PRQ198.html, pp. 2–4 [Accessed Dec. 3, 1997].

"Automatic activation—Syndesis adds order processing to provisioning platform," Internet Telephony, http://www.syndesis.com/news/art/art_telephony.html, Jun. 2, 1997, pp. 1–22.

"Automatic Map Management Application Note," Onion Peel Technology Report, Onion Peel Solutions, Summer 1997, vol. 01 No. 9, pp. 1–6.

"Bandwidth Management Can Lead to Better ISP Service," Network World, Sep. 8, 1997, pp. 1–2.

(List continued on next page.)

*Primary Examiner*—Viet D. Vu
*Attorney, Agent, or Firm*—Seed IP Law Group PLLC

[57] ABSTRACT

A Mid-Level Manager (MLM) network information management system monitors and manipulates the flow of private information on public networks. The MLM system begins by retrieving and storing information about subscribers to the public networks. The MLM also queries the computers of the public networks to obtain information about network configuration and status. Upon receiving network information, the MLM system uses the stored subscriber information to analyze the network information and to determine the subscribers to which the network information pertains. If network information pertains to a subscriber and the subscriber is authorized to receive that information, the MLM systems adds that network information to a subscriber-specific data storage location. In addition, network status information of interest to administrators of the public network is stored in a separate data storage location. The MLM system supplies the subscriber-specific network information to subscribers to allow them to monitor their networks in a real-time manner, ensuring that a subscriber receives only that information for which they are authorized and that only authorized parties will receive a subscriber's private data. The MLM system also provides the current network status information to public network administrators. Subscribers are also allowed to manipulate their flow of information, such as by changing the bandwidth on a PVC, in a real-time manner. The MLM system handles requests from subscribers to modify their levels of MLM service or their levels of service provider's public network service, and takes appropriate action to effect the change.

8 Claims, 11 Drawing Sheets

OTHER PUBLICATIONS

"Bell Canada Chooses OSI's NetExpert to Help 'Drive' Electronic Commerce," Objective Systems Integrators, Aug. 27, 1997, pp. 1–2.

Cabletron Systems Product Information, Cabletron Systems, Apr. 21, 1997, pp. 1–6.

Castle Rock Computing Product Information, Castle Rock Computing, Inc., Jun. 1994, pp. 1–10.

"Chapter 7: Level 2 Topology," Module 7 Documentation, Onion Peel Solutions, Jan. 1998, pp. 7–1 to 7–18.

"Circuit Provisioning," http://www.cbis.com/circprov.html, pp. 1–3 [Accessed Nov. 4, 1997].

Com.pendium Issue 1 1997, Objective Systems Integrators, Jan. 1997, pp. 1–20.

Com.pendium Issue 2 1997, Objective Systems Integrators, Jun. 1997, pp. 1–16.

"Controlling A Decentralized Environment With Micromuse Netcool Service–Level Management," Micromuse, Inc., May 1997, pp. 1–7.

"Distributed Smarts: Agents Lower Network Load," Data Communications, Jul. 1995, pp. 1–2.

"HP OpenView Extensible SNMP Agent," Product Brief, Hewlett Packard, Jan. 1996, pp. 1–4.

"Information is your business—CrossKeys Network Solutions help keep it that way," CrossKeys Systems Corp., Jan. 1997, pp. 1–3.

"Introduction to SNMP Research International," http://www.snmp.com/basicintro.html, pp. 1–3 [Accessed Jan. 12, 1998].

"ISPs turn to Cisco for service–level monitoring," Network World, Sep. 1, 1997, p. 1.

MainStreet Xpress Product Information, Siemens AG and Newbridge Networks Corp., Jan. 1997, pp. 1–32.

"Managing Network Resources From a Financial Viewpoint," Concord Communications and Onward Technologies, Jan. 1997, pp. 1–4.

"MAXM Documentation," MAXM Systems Corp., Jan. 1994, pp. 1–29 and Table of Contents.

"NetExpert Gateways," http://www.osi.com/Solutions/Gateway.html, pp. 1–4 [Accessed Dec. 3, 1997].

"NetExpert," http://www.osi.com/Solutions/NetExpert.html, pp. 1–2 [Accessed Dec. 3, 1997].

"New Products," http://www.osi.com/Solutions/NewProducts.html, pp. 1–5 [Accessed Dec. 3, 1997].

"Newbridge Networks, Concord and CrossKeys Provide Advanced Performance Management Services for Siemens/Newbridge," Newbridge Networks, Oct. 29, 1997, pp. 1–4.

"Nortel tools monitor frame, ATM nets," Network World, Jun. 16, 1997, pp. 1–2.

"Onion Peel Solutions announces joint project with Hewlett Packard," Onion Peel Solutions, Press Release, Jan. 5, 1998, pp. 1–2.

"OpenView Maps Application Note," Onion Peel Technology Report, Onion Peel Software, Summer 1995, vol. 01 No. 2, pp. 1–5.

"OpenView Submap Contexts Application Note," Onion Peel Technology Report, Onion Peel Software, Winter 1996, vol. 01 No. 8, pp. 1–3.

"OSI Alliances," Objective Systems Integrators, Jan. 1997, pp. 1–5.

"OSI Announces Fiscal 1998 First–Quarter Results," Objective Systems Integrators, Oct. 21, 1997, pp. 1–4.

"OSI Releases iSAC 2.0; Becomes First to Provide Service Activation Capabilities Across Hybrid Network Domains," Objective Systems Integrators, Nov. 18, 1997, pp. 1–2.

"Physical Topology Application Note," Onion Peel Technology Report, Onion Peel Solutions, Spring 1998, vol. 02 No. 1, pp. 1–3.

"Products—Features and Benefits," Concord Communications and Onward Technologies, Jan. 1997, pp. 1–4.

"Provisioning," http://www.evolving.com/provisioning/, p. 1 [Accessed Nov. 4, 1997].

"Regaining Control of the Enterprise: Centralizing Event Management in Decentralized Environments," Micromuse, Inc., May 1997, pp. 1–12.

"RoboMap V2 Best Practices Application Note," Onion Peel Technology Report, Onion Peel Software, Winter 1996, vol. 01 No. 7, pp. 1–5.

"SNMP News," http://www.snmp.com/newsletters/sn4q96.html, pp. 1–3 and 9–10 [Accessed Jan. 12, 1998].

"SolutionCore Product Overview—TCSI's Suite of Telecom Software Development Products," http://www.tcsi.com/ProdServ/SolCore.html, pp. 1–16 [Accessed Nov. 4, 1997].

"Supported Operating Systems," http://www.snmp.com/supported.html, pp. 1–4 [Accessed Jan. 12, 1998].

"Telematics Adds Network Change Management for NCX ATM Multi–Service Networks," Telematics International, Oct. 17, 1995, pp. 1–9.

"The 1998 Data Comm Market Forecast," http://www.saxophone.agora.com/whats_hot/forecast98.html, pp. 1–11 [Accessed Dec. 11, 1997].

"The PATROL Knowledge Module for SYBASE," BMC Software, Jul. 5, 1995, pp. 1–4.

"Tomorrow's network management technologies—Net Expert managing networks today," Objective Systems Integrators, Jan. 1995, pp. 1–22.

"User Plans for VPN Products and Services 1998," Infonetics Research, Oct. 1997, pp. 1–7.

"Visual UpTime and Visual OnRamp—Network Support Systems," Visual Networks, Feb. 1996, pp. 1–24.

"Visual UpTime—The Frame Relay Network Support System," Visual Networks, Feb. 1996, pp. 1–9.

"What's New in Network Health 3.5," Concord Communications and Onward Technologies, Jan. 1997, pp. 1–6.

"Why Choose SNMP Research International?," http://www.snmp.com/whyus.html, pp. 1–3 [Accessed Jan. 12, 1998].

METHOD AND SYSTEM FOR MONITORING AND MANIPULATING THE FLOW OF PRIVATE INFORMATION ON PUBLIC NETWORKS

TECHNICAL FIELD

The present invention relates generally to monitoring computer networks, and more particularly to monitoring and manipulating the flow of private information on public computer networks.

BACKGROUND OF THE INVENTION

With personal computer systems becoming increasingly pervasive, many companies have deployed local area networks (LANs) that connect all the computers at a given location. While such LANs allow the interchange of information between the local computers at one physical location, computers at different physical locations may need to exchange information in a similar manner. One solution to connecting computers at two different locations involves creating a physical connection between the two locations, such as by installing a copper or fiber optic cable between the locations. Alternately, a company can use an existing physical connection between two locations if one exists. Since the telephone companies (e.g., Pacific Bell and ATT) have pre-existing physical connections between most locations, one alternative to building and maintaining a physical connection between two locations is for a company to lease an existing physical connection or line from a telephone service provider. Typically, the leased line will be used exclusively by the lessor, thus allowing a company to create a wide area network (WAN) by leasing a connection between two local LANs. Moreover, such a leased line will provide secure private (i.e., not susceptible to monitoring or interception by third parties) communication and guaranteed bandwidth between the two locations.

A more recent alternative for companies to connect computers at two locations involves using a service provider's public network between the two locations. In this situation, a company will subscribe to the service provider's public network, and will establish at least one User-to-Network Interface (UNI) at each location to connect the LAN at that location to the public network. A Permanent Virtual Circuit (PVC) can the LAN at that location to the public network. A Permanent Virtual Circuit (PVC) can then be defined between the two UNIs, providing a virtual connection between the two locations that appears to be a dedicated, physically-connected circuit. Thus, a computer at one location can use the PVC to send information to a computer at the other location in the same manner that the computer would exchange information with a local computer. Having two or more private networks connected over a public network is referred to as a Virtual Private Network (VPN), and the customers using the public network are referred to as subscribers.

The use of VPNs rather than leased lines provides advantages to both the service provider and the subscriber. For the service provider, the use of VPNs provides flexibility. Since public networks are typically broadband packet-switched systems (e.g., frame relay or ATM), there are many possible pathways to send information from one location to another. This allows a service provider to dynamically vary the physical connection used to implement a PVC on a per-message or a per-packet basis, thus maximizing the overall network throughput. Since subscribers will rarely use their maximum bandwidth on a continuous basis, service providers can over-allocate the bandwidth on the public network and still provide sufficient levels of service. This in turn benefits the subscribers by lowering their cost of service. In addition, the redundant physical connections of a PVC enhances network reliability for subscribers.

However, while VPNs provide some advantages to subscribers, they also have various drawbacks. In particular, information which a subscriber may desire to keep private will be passing over a public network. Thus, extra measures must be taken by either the subscriber (e.g., encryption) or the service provider (e.g., restricted access to public network information) to ensure that private information passing over the public network remains private. In addition to these privacy issues, managing an enterprise (i.e., company-wide) network is much more difficult with a VPN than with leased lines because the subscriber does not have direct access to the various computers and connections that make up the service provider's public network. When a company owns all of the computers and the wiring between them, the company can monitor the flow of information on the network and remedy problems that arise. For example, network administrators can ensure that the network bandwidth is sufficient for the company's needs, and that the available bandwidth is not underutilized by the company. If a bandwidth problem is recognized, the company can physically add or remove cables to remedy the problem. Network administrators can also use Network Management Systems (NMSs) such as HP OpenView from Hewlett-Packard Company to view the status of the computers on a LAN, detect when problems occur (e.g., a computer becomes unavailable), and mitigate problems (e.g., route network traffic around a computer that has crashed).

While VPN subscribers would like to perform these same network management functions on their VPNs, the use of public networks creates significant hurdles in monitoring enterprise networks by receiving current network status information and in manipulating these networks to remedy problems. As a limited remedy, some service providers employ Customer Network Management (CNM) systems that provide limited information to subscribers about their PVCs on the public network. However, these CNM systems may provide only historical statistical data on a periodic basis (e.g., once a week or once a month). While these network traffic reports may be used by a network administrator to detect long-term systematic bandwidth problems, this level of information is not sufficient for a subscriber to view current status information and quickly resolve problems that arise.

Beyond the above problems inherent to the basic VPN configuration, several common situations exist that only exacerbate these problems. For example, many service providers have public networks that include hardware from multiple vendors. Since each vendor's system typically track only their own data, often with proprietary interfaces, a subscriber may receive network traffic reports for each vendor and be forced to integrate the information themselves. In addition, it is increasingly common for a PVC to stretch across multiple service providers. For example, a company with two geographically remote locations must commonly deal with local service providers at each location, and a long-distance service provider between them. The subscriber may thus receive network traffic reports from each service provider. Other situations which create problems for managing enterprise networks include PVCs with different owners at the two ends (e.g., an extranet with a company at one end and a subsidiary supplier at the other end), multiple PVCs that share a single UNI (e.g., one location with a single UNI and with multiple PVCs), and PVCs composed of multiple fractional PVCs.

SUMMARY OF THE INVENTION

Embodiments of the present invention overcome the limitations of the prior art and provide additional benefits by monitoring and manipulating the flow of private information on public networks. Some embodiments provide a method and system for gathering current network status information for public networks and supplying subscriber-specific network information to subscribers of the networks. A Mid-Level Manager (MLM) network information management system begins by retrieving and storing information about subscribers to the public networks, including a subscriber's User-to-Network Interfaces (UNIs), Network Management Systems (NMS), and current authorizations and service levels. The MLM also queries the computers of the public networks to obtain information about initial network configuration and status.

After the initial determination of network configuration and status information, the MLM system continues to monitor the public network for changes in network status, including the status of subscriber Permanent Virtual Circuits (PVCs). Upon receiving network information, the MLM system uses the stored subscriber information to analyze the network information and to determine the subscribers to which the network information pertains. If network information pertains to a subscriber and the subscriber is authorized to receive that information, the MLM systems adds that network information to a subscriber-specific data storage location. In addition, network status information of interest to administrators of the public network is stored in a separate data store. The MLM system can combine network information from the computers of multiple vendors and of multiple service providers so that the system provides a single uniform view of a subscriber's PVC over public networks. If subscribers and service providers have manager stations that can receive unsolicited network status information, the MLM system forwards the appropriate network information to subscribers or service providers on a real-time basis when the network information is received and analyzed.

In addition to maintaining current subscriber-specific network status information, the MLM system acts as a real-time transaction server for requests from subscribers and public network administrators. Upon receiving requests from subscribers for current network information pertaining to them, the MLM system first verifies the identity of the subscriber and that the subscriber has the authority to make the request. If the request is authorized, the MLM system sends current subscriber-specific network information to the requesting subscriber. To supply the information, the MLM retrieves the information from its subscriber-specific data storage location if that information is sufficiently accurate. If not, the MLM instead queries the public networks for the current information. Thus, the MLM ensures that a subscriber receives only that information for which they are authorized, and that only authorized parties will receive a subscriber's private data.

Upon receiving a request from a service provider (e.g., a public network administrator) for network status information, the MLM system will return current network status information in a manner similar to that for a subscriber. If a subscriber requests a change in a service that is provided by the MLM system (e.g., response time to subscriber requests for network information) or the public network service provider (e.g., bandwidth on a PVC), the MLM system satisfies the request if possible. Upon receiving a request to modify an MLM level of service, the MLM system modifies its stored levels of subscriber authorization so that future requests will be handled using the modified subscriber authorization. If a received request is instead to modify a service provider's level of service, the MLM system performs the appropriate request or modification to accomplish the change (e.g., forwarding the appropriate message to a service provider management station).

One embodiment involves a method for securely monitoring concurrent flows of information from multiple users on a public network of computers. Each private information flow originates from a private source computer of the user and arrives at a private destination computer of the user. This method ensures that each user can monitor only the flow of private information for the user. The method includes the steps of 1) identifying the private source computer and the private destination computer for each of the plurality of users; 2) retrieving network status information for the public network that includes a current status of each of the public network computers; 3) gathering information about private information flows on the public network by repeatedly a) receiving network status information for the public network that includes a current status of each of the public network computers, b) receiving network operation information for the public network that includes summaries about information traveling from source computers through the public network to destination computers, and c) for each user, analyzing the received network operation information to identify the summaries about information whose source or destination computer is the private source computer or the private destination computer of the user and storing the identified summaries in a storage location specific to the user; and 4) sending to each user recently received network status information and recently stored identified summaries from the storage location specific to the user.

BRIEF DESCRIPTION OF THE DRAWINGS

In the drawings, like reference numbers refer to similar elements or steps. Additionally, the most significant digit in a reference number refers to the figure number in which that element is first introduced (e.g., element 204 is first introduced in FIG. 2).

DETAILED DESCRIPTION OF THE INVENTION

Figure 1:
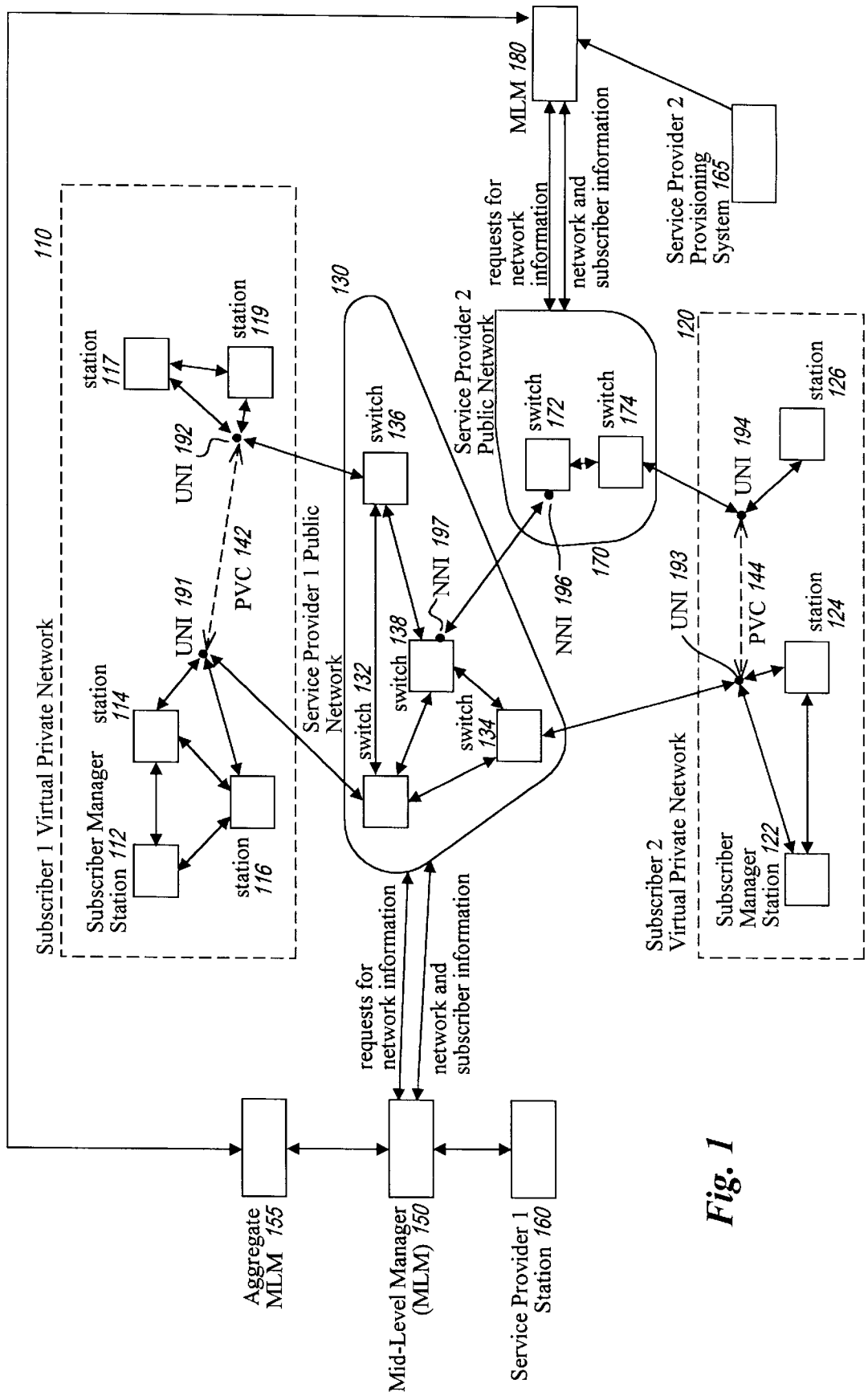
FIG. 1 is a block diagram illustrating an embodiment of Mid-Level Manager (MLM) systems operating in an environment with two virtual private networks.

A network information management system, and in particular, a method and system for monitoring and manipulating the flow of private information on public networks, is described in detail herein. In the following description, numerous specific details are presented, such as ordering and execution of steps, hardware components, etc., in order to provide a thorough understanding of the present invention. One skilled in the relevant art, however, will readily recognize that the invention can be practiced without using the specific details described herein. In other instances, well known structures or operations are not shown or described in detail to avoid obscuring the description of the embodiments.

As explained herein, an exemplary embodiment of the present invention provides a network information management system for monitoring and manipulating the flow of private information on public networks. The exemplary embodiment is embodied in an application running on a computer system in communication with the computers of one or more public networks (e.g., a telephone service provider's public network). A Mid-Level Manager (MLM) network information management system gathers current network status information for public networks that it is monitoring, and supplies subscriber-specific network information to subscribers of the networks.

The MLM system begins by retrieving and storing subscriber provisioning information about subscribers to the public networks, including the subscriber's User-to-Network Interfaces (UNIs), Network Management System (NMS), and current authorizations and service levels. The subscriber information can be retrieved in a variety of ways, such as by receiving information manually entered by a network administrator for one of the public networks or by automatically retrieving the information from a service provider provisioning system if one is available.

The MLM also queries the computers of the public networks to obtain information about initial network configuration and status, such as the status of subscriber UNIs. The MLM automatically issues network queries (e.g., SNMP network queries) that determine the required network configuration and status information, such as by contacting one or more network proxy agents (i.e., software agents which respond to protocol requests for another system) and retrieving network configuration and status information from them. The retrieved network configuration or status information is typically stored in data structures (e.g., Management Information Base (MIB) data structures) at the proxy agent.

After the initial determination of network configuration and status information, the MLM system continues to monitor the public network for changes in network status. The MLM system can monitor the public network in multiple ways. For example, the MLM system can execute an event processing routine that detects network events related to network status or configuration (e.g., network traps). Alternately, the MLM system can execute a polling routine that occasionally retrieves available network configuration and status information. One type of polling routine can execute frequently (e.g., every 10 seconds) to retrieve basic network status information such as the availability of network computers and proxy agents (i.e., whether they respond to network queries or requests). Another type of polling routine can execute on a less-frequent periodic basis (e.g. once a day) to retrieve more detailed network information regarding all known network resources. The polling routines can also execute when manually invoked by a network administrator, or when the event processing routine receives an indication that new network information is available.

When public network information is received, the MLM system uses the stored subscriber information to analyze the network information and to determine the subscribers to which the network information pertains. For example, if received network information relates to a particular UNI, the MLM system identifies the subscriber who owns the UNI. Alternately, some network information may reference particular PVCs that belong to one or more subscribers, and include information about the UNIs at the PVC ends. The MLM system will first use the stored subscriber UNI information to map the one or more subscribers to the PVC, thus identifying which subscribers will receive network status information about this PVC. However, if a PVC has one subscriber at a front end of a PVC and a different subscriber at the back end, other network information about the UNI at the back end of the PVC will not be identified as pertaining to the subscriber on the front end.

If the MLM system determines that network information pertains to a subscriber and that the subscriber is authorized to receive that information (e.g. a particular subscriber may have selected a service level which indicates they are willing to pay only for certain types of network status information), the MLM system adds that network information to a subscriber-specific data storage location. In one embodiment, copies of retrieved MIB data structures are created for each subscriber and are populated with network status information that pertains to that subscriber. In addition to the subscriber-specific network information, network status information of interest to administrators of the public network is stored in a separate data storage location. The network information can be stored in a variety of manners, such as in a file system, a relational database, an object database, volatile memory (e.g., RAM), etc. Those skilled in the art will appreciate that different types of storage systems provide different advantages (e.g., RAM provides very quick access to data).

In the exemplary embodiment, the MLM system sends all network configuration and status information of interest to a subscriber as a single unified view. For example, a subscriber PVC may include physical connection information from multiple hardware vendors in a single service provider's public network, as well as physical connection information from multiple service providers' public networks. In this situation, the MLM system can gather public network information in a variety of ways. Each public network could have multiple MLM systems (e.g., one MLM system for each type of hardware vendor or one MLM system for each group of 1000 subscribers). Alternately, each public network could have a single MLM system that retrieves network information for that public network. In yet another alternative, a single MLM system could retrieve network information for multiple public networks. Regardless of the actual number of MLM systems, one or more MLM systems act as an aggregate MLM system that aggregates all subscriber-specific network information before the subscriber-specific network information is sent to the subscriber. Thus, the MLM system provides a single uniform view of a subscriber's PVC over the public networks.

After network information is gathered and separated into subscriber-specific network information, the information is sent to the subscribers. If a subscriber has a manager station which can receive unsolicited network status information, the MLM system forwards the appropriate subscriber-specific network information to that subscriber station on a real-time basis as the network information is received and analyzed. In one embodiment, the subscriber-specific network information for a subscriber includes copies of MIB data structures with information that pertains to that subscriber. If the subscriber's NMS can receive MIB data structures, then the subscriber-specific MIB data structure copies can be sent directly to the NMS.

Rather than forwarding real-time data, the MLM system can instead act as a real-time transaction server for requests from subscribers for their current network information. Upon receiving such requests from subscribers, the MLM system first verifies the identity of the subscriber (e.g., passwords, public key encryption, biometric means, etc.) and then determines whether the subscriber has the authority to make the request (e.g., the subscriber may request information to which they do not have access, or they may request accessible information but have exceeded their current allotment of requests). If the request is authorized, the MLM system sends current subscriber-specific network information to the requesting subscriber. To supply the information, the MLM determines if the information in its subscriber-specific data storage location is sufficiently accurate, and if so retrieves the information from there. If the information is not sufficiently accurate, the MLM instead gathers current network information for the subscriber from the public networks. The determination of sufficient accuracy can be made in a variety of ways, such as a default or user-specific limit on how long before information is considered to be not current, or a minimum requirement of a specified amount or type of network information. By supplying only sufficiently accurate subscriber-specific network information, the MLM ensures that a subscriber receives only that information for which they are authorized, and that only authorized parties will receive a subscriber's private data.

In addition to processing transactions from subscribers requesting network information, the MLM system can process other types of transactions. For example, upon receiving a request from a service provider (e.g., a public network administrator) for network status information, the MLM system will return current network status information in a manner similar to that for a subscriber. Alternately, if a subscriber requests a change in a service provided by the MLM system (e.g., limits on the number of subscriber requests per hour or response time to subscriber requests for network information) or the public network service provider (e.g. bandwidth on a PVC), the MLM system satisfies the request if possible. Upon receiving a request to modify an MLM level of service, the MLM system modifies its stored levels of subscriber authorization so that future requests will be handled using the modified subscriber authorization. If a received request is instead to modify a service provider's level of service, the MLM system performs the appropriate request or modification to accomplish the change (e.g., forwarding the appropriate message to a service provider management station).

Referring now to FIG. 1, an exemplary embodiment illustrates three MLM systems operating in an environment with two Virtual Private Networks (VPNs) and two public networks operated by service providers. The two public networks illustrated in FIG. 1 are public network 130 operated by Service Provider 1, and public network 170 operated by Service Provider 2. Public network 130 consists of four interconnected switches-switch 132, switch 134, switch 136, and switch 138. Similarly, public network 170 consists of interconnected switches 172 and 174. Public networks 130 and 170 are connected between Network-to-Network (NNI) 197 on switch 138 and NNI 196 on switch 172. Those skilled in the art will appreciate that service providers' public networks can include network devices other than switches and NNIs, that public networks will typically consist of much larger numbers of devices, and that public networks may be interconnected with multiple NNIs.

FIG. 1 also illustrates two VPNs, those being Subscriber 1's VPN 110 and Subscriber 2's VPN 120. VPN 110 includes Subscriber Manager Station 112, stations 114, 116, 117, and 119, and UNIs 191 and 192. Each station is one of a variety of network device types, such as a computer or a printer. As is illustrated, Subscriber Manager Station 112 and stations 114 and 116 are part of one LAN, while stations 117 and 119 are part of a separate LAN. Those skilled in the art will appreciate that LANs will typically consist of many more computers than those illustrated. While the two LANs belonging to Subscriber 1 do not have a dedicated private connection between them (e.g., a leased line), computers in the two LANs can communicate with each other via the virtual connection of PVC 142. From the viewpoint of Subscriber 1, station 114 can communicate with station 119 by passing a message to UNI 191, through PVC 142 to UNI 192, and then to station 119.

While PVC 142 is shown as virtually connecting UNI 191 to UNI 192, the actual physical connection occurs via public network 130. Thus, the message from station 114 to station 119 actually travels to UNI 191 and then through the public network 130. The message can pass through the public network 130 in a variety of ways, such as directly from switch 132 to switch 136, or indirectly from switch 132 to switch 136 via switches 138 and 134. When the message arrives at switch 136, it is passed to UNI 192 and then to station 119. Similarly, Subscriber 2's VPN 120 consists of UNIs 193 and 194, PVC 144 between the two UNIs, Subscriber Manager Station 122, and stations 124 and 126. As is shown, UNI 193 connects to Service Provider 1's switch 134, and UNI 194 connects to Service Provider 2's switch 174. Thus, while Subscriber 2 sees PVC 144 as a virtual connection between the UNIs 193 and 194, PVC 144 actually includes physical connections through both public network 130 and public network 170.

MLM 180 monitors and stores network information for public network 170. When MLM 180 is first initialized, it first determines the network configuration of public network 170 (e.g., NNI 196 and UNI 194). In addition to gathering network configuration information, MLM 180 also gathers network status information for public network 170 (e.g., whether UNI 194 is currently available). As described previously, MLM 180 can obtain this network configuration and status information in a variety of ways. If public network 170 is a frame relay network, MLM 180 may be able to gather MIB Customer Network Management (CNM) information for public network 170. MIB data structures using defined standard formats, such as RFC 1213, RFC 1573, RFC 1406, and RFC 1604, can contain both network configuration and network status information.

In addition to retrieving the network configuration and status information, MLM 180 also retrieves information related to the subscribers of public network 170. As described above, this subscriber information can be gathered in a variety of ways (e.g., from Service Provider 2's Provisioning System 165), and includes such things as subscriber UNIs, the subscribers' NMS systems, and information about the subscribers' public network level of service (e.g., bandwidth over PVC 144 or guaranteed redundancy). Since Subscriber 2 is the only subscriber shown for public network 170, the subscriber information may be limited to UNI 194. After retrieving the subscriber information, MLM 180 stores the subscriber information internally in a Subscriber Information Cache, and creates a subscriber domain for each subscriber to contain network information for that subscriber. In one embodiment, the public network 170 MIB data structures are duplicated in RAM for each subscriber, with the data structures for a given subscriber containing only the network information relevant to that subscriber. Alternately, the subscriber network information could be stored in relational or object data bases, or in a variety of other formats.

After the initial gathering of subscriber network information, MLM 180 continues to periodically retrieve updated network configuration and status information from public network 170. This updated information can be used to identify both new hardware that has been added as well as old hardware temporarily or permanently unavailable. The updated network information will also include status information for resources such as UNIs and PVCs, and can include a variety of other types of information such as resource performance data (e.g., packet counts) and service level agreement data (e.g., whether the public network is meeting agreed-upon levels for network-wide performance such as faults). When MLM 180 receives this updated network information, it again uses the subscriber information to determine which pieces of network information are relevant to which subscribers, and then updates the subscriber domains with the new network information.

As an example, MLM 180 may receive information from public network 170 that includes status information for all public network 170 UNIs and PVCs. The public network information may reference these resources with a service provider-specific or vendor-specific numbering system, with a unique number for each resource. PVCs such as PVC 144 may be referenced only by the UNIs which form the ends of the PVC. However, since public network 170 only contains the portion of PVC 144 between UNI 194 and NNI 196, the network status information from public network 170 may include only the status information for this portion of the PVC. If so, MLM 180 may also need to retrieve vendor-specific information which maps public network 170's unique resource number for PVC 144 to a different unique resource number for PVC 144 that is maintained by public network 130. After receiving the information, MLM 180 retrieves the subscriber information that includes the subscribers' UNIs. MLM 180 will typically maintain its own unique numbering system for referencing public network 170's resources such as subscriber UNIs. This allows MLM 180 to mask service provider information that can be contained in the public network 170 numbering system, to maintain a single reference number for resources such as PVC 144 that may have multiple different reference numbers, and to provide more useful information to subscribers (e.g., having a subscriber's resources being sequentially numbered starting at 1). Thus, MLM 180 will translate the public network 170's numbering system for UNIs to its own UNI numbering system, and then use its own mapping from UNIs to subscribers to identify the public network 170 resources with UNI references that correspond to the various subscribers. After identifying that UNI 194 and PVC 144 correspond to Subscriber 2, the network information for these resources is stored in Subscriber 2's subscriber-specific network information storage location.

In addition to periodic updates of current network information, MLM 180 can also receive a manual indication from a public network user administrator (not shown) that updated network information should be gathered, or a notification from a network proxy agent (not shown) that updated network information is available. MLM 180 can also establish an event processor (e.g., a trap processor) to monitor public network 170 for unsolicited messages, typically generated by public network 170 switches or proxy agents, that indicate a change has occurred in the network (e.g. a switch or PVC has become unavailable).

After network and subscriber information has been gathered, MLM 180 can also receive transaction requests from subscribers and service providers. Each subscriber can request MLM 180 for current network information for that subscriber. In order to prevent overloading of MLM 180 with subscriber requests, MLM 180 can set limits for each subscriber on how frequently that subscriber can request network information (e.g., 4000 requests per hour). In one embodiment, each subscriber will have a modifiable MLM level of service that limits the frequency that subscriber requests will be processed. When MLM 180 receives a request from a subscriber (e.g., from an NMS or a web browser on Subscriber 2's Subscriber Manager Station 122) for current network information, MLM 180 first verifies the identity of the requesting subscriber. After MLM 180 verifies the identity and determines that the subscriber's level of service allows the request to be processed, MLM 180 next determines if the stored subscriber network information in the subscriber domain is sufficiently current. Each subscriber can have a time-to-live value which indicates how long network information is considered to be current. This information can be specified as part of the subscriber's service provider level of service and/or the subscriber's MLM level of service. If the subscriber information in the subscriber domain is sufficiently current, this information is retrieved and sent to the requesting subscriber. If the stored information is not sufficiently current, MLM 180 instead retrieves current network information for the subscriber from public network 170.

In addition to subscriber requests for current network information, subscribers can also request modification in their MLM level of service or their service provider level of service. For example, if the subscriber desires to increase their limit on the frequency of subscriber requests that will be processed, the subscriber can request that this level of service be increased. Typically, increasing a level of service will require a subscriber to pay an additional amount for the increased service, and may require pre-authorization or an authorization system so that a subscriber can dynamically increase a service level. Predefined levels of service may exist, with different billing rates for each level of service. Alternately, billing rates and decisions to modify level of service may vary with the current demand (i.e., frequency of requests) on MLM 180. If the subscriber requests a change in the service provider level of service, MLM 180 can update its stored subscriber information to indicate the new service provider level of service, and forward a request or transaction to an appropriate service provider station to affect the change. Alternately, if the subscriber requests a change in an MLM 180 level of service, MLM 180 can directly update its stored subscriber information to effect the new level of service.

In addition to responding to subscriber requests for network information, MLM 180 may also be able to supply unsolicited real-time network information to Subscriber 2. If Subscriber Manager Station 122 can receive unsolicited network information messages, MLM 180 can automatically forward network information to Subscriber 2. To supply this real-time or near-real-time information, MLM 180 first receives current subscriber-specific network information from Public Network 170. When MLM 180 receives current network information for Subscriber 2, MLM 180 immediately sends the information to Subscriber Manager Station 122. For example, the network information may be forwarded to an NMS executing on Subscriber Manager Station 122. Thus, MLM 180 can provide current network status information to Subscriber 2 about hardware in public network 170 that carries PVC 144 information. In order to facilitate communication between MLMs and Subscriber Manager Stations, an additional PVC (not shown) is typically defined between an MLM and each Subscriber Manager Station with which the MLM will exchange information.

In a similar manner to MLM 180, MLM 150 stores current network and subscriber information for public network 130. Public network 130 contains network information for UNIs 191, 192, and 193, as well as PVCs 142 and 144. Since PVC 142 is physically implemented completely within public network 130, MLM 150 will contain all the network information related to PVC 142. However, as discussed above, the network information related to PVC 144 will be shared by public networks 130 and 170. Thus, if Subscriber 2 requests network information on PVC 144, the network information must be retrieved and combined from MLM 150 and MLM 180 so that the PVC appears to Subscriber 2 as a single logical connection. Aggregate MLM 155 serves this function of providing a single unified view for multi-segment PVCs such as PVC 144 by retrieving information from MLMs 150 and 180 and aggregating this information into a single view. As discussed above, this may involve retrieving service provider-specific or vendor-specific information so that PVCs can be tracked across public network boundaries such as the NM 196 to NNI 197 connection. Similarly, while PVC 142 is physically implemented solely within public network 130, the subscriber setup for a PVC may require extra processing of network information by MLM 150. For example, PVC 142 could be composed of multiple fractional PVCs each operating on different channels and each appearing logically separate to Subscriber 1. In this situation, MLM 150 may need to retrieve additional vendor-specific or service provider-specific information which can be used to separate network status information about PVC 142 into constituent parts for each fractional PVC. Those skilled in the art will appreciate that other such situations may require additional processing by the MLM.

In the same manner that subscribers can make transaction requests for current network information, a Service Provider 1 user (e.g., the service provider network administrator) can use Service Provider 1 Station 160 to request current network status information for public network 130. Even if the service provider can retrieve this information directly from the switches in the public network, it may be more efficient and faster to retrieve this information from MLM 150, particularly if the public network includes hardware from multiple different vendors. In the same way that an Aggregate MLM unifies network information from multiple subnetworks, an MLM may similarly need to collect network status information from different vendor-specific subnetworks within the public network and aggregate this information into a single unified view for the public network. When a service provider user request for current network information is received, the identify of the user is first verified. After the identity has been verified, some or all of the stored network information for the public network can be retrieved and supplied to the requesting user. In the same manner that each subscriber can have a time-to-live value, each service provider user can have a similar time-to-live value. Thus, if the stored information is not sufficiently current, MLM 150 will gather current network information directly from the public network rather than sending the stored network status information. While service provider requests for network information will normally come to MLM 150 from only Service Provider 1 users, Service Provider 2 users may also be authorized to request some network information related to public network 130.

Another subscriber PVC setup that requires extra processing of network information by MLM 150 involves a PVC that is defined between two different subscribers, such as a PVC 146 (not shown) between Subscriber 1's UNI 191 and Subscriber 2's UNI 193. If PVC 146 was present in addition to the other PVCs, then multiple PVCs would be defined from a single UNI (e.g., PVC 146 and PVC 144 would both use UNI 193). In this situation, both Subscriber 1 and Subscriber 2 would receive network information about their multi-owner PVC 146 connection, but not about other UNI information for the UNI at the other end of the PVC. For example, Subscriber 1 may receive network status information about the number of packets sent to and received from UNI 191 on all PVCs using the UNI, and about the bandwidth usage of PVC 146 as a whole, but not about the number of packets sent to and received from UNI 193 that do not relate to the PVC (e.g., packets for PVC 144).

Those skilled in the art will appreciate that the elements illustrated in FIG. 1 are for illustrative purposes only. Actual VPN operating environments will typically include additional subscribers, additional service providers, and additional stations in each network. In addition, there can be multiple MLMs for a single public network (e.g., to provide redundancy or additional processing power), or a single MLM to gather information for both public networks.

Figure 2:
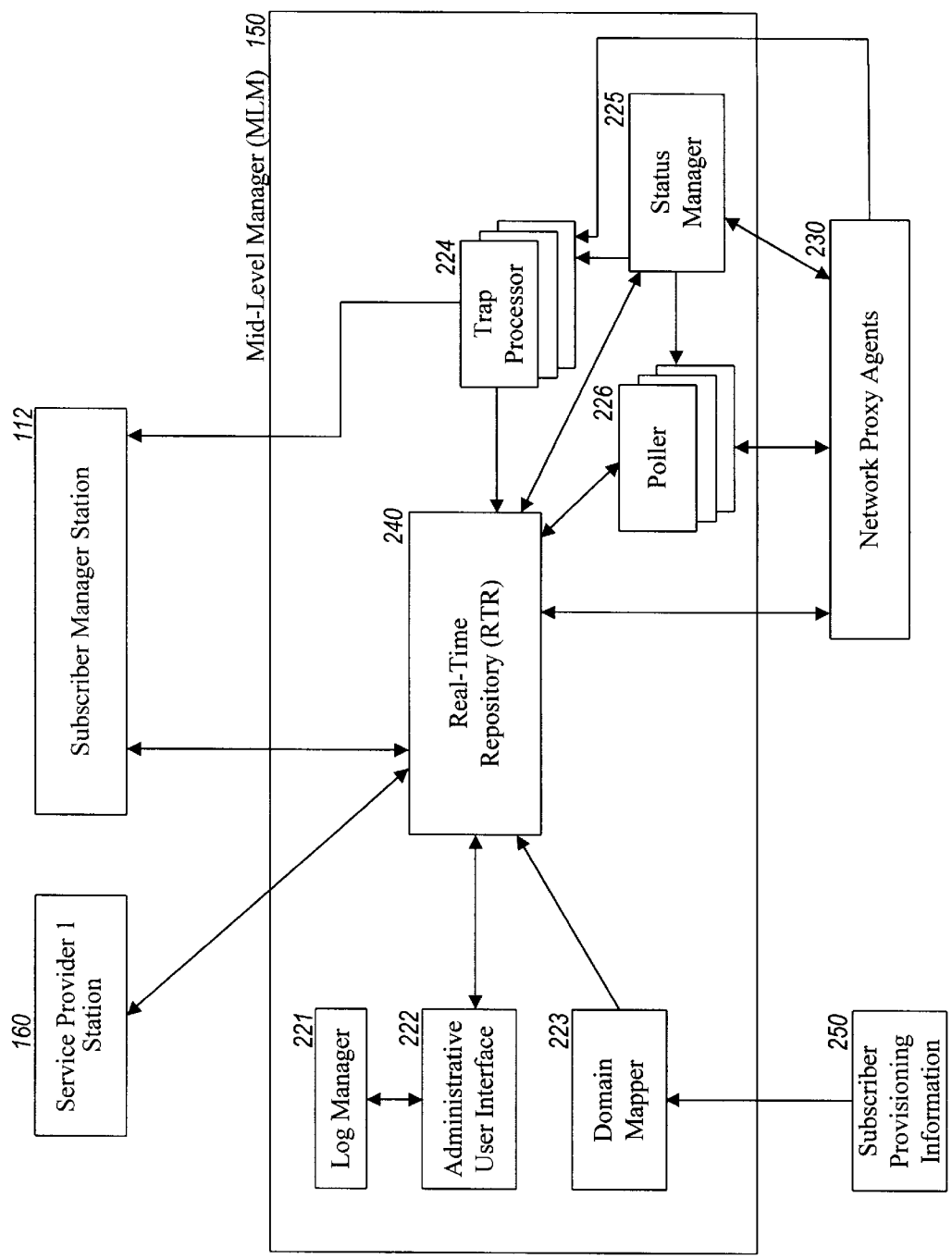
FIG. 2 is a detailed block diagram illustrating an embodiment of the MLM system and its components.

FIG. 2 illustrates the components and information flow of MLM 150. Those skilled in the art will appreciate that MLM 150 can be implemented in a variety of ways, such as software executing on a general-purpose computer, software executing on dedicated hardware, microcode executing on a chip, etc. The components of MLM 150 include Log Manager 221, Administrative User Interface 222, Domain Mapper 223, Trap Processor 224, Status Manager 225, Poller 226, and Real-Time Repository (RTR) 240. The operation of each of the MLM 150 components will be discussed in greater detail below with regard to FIGS. 4–11.

RTR 240 is an intelligent data cache that contains subscriber information and subscriber-specific network information. Upon initialization, Domain Mapper 223 and Administrative User Interface 222 are responsible for supplying RTR 240 with current subscriber information. If Subscriber Provisioning Information 250 is available from a Service Provider Provisioning System for public network 130, the Domain Mapper 223 retrieves the Subscriber Provisioning Information 250 containing subscriber information for subscribers to public network 130, and forwards this information to RTR 240. Alternately, if Subscriber Provisioning Information 250 is not available, a service provider user can enter such subscriber information via Administrative User Interface 222, which forwards the subscriber information to the RTR.

Status Manager 225, Trap Processor 224, and Poller 226 are responsible for retrieving network information from public network 130, analyzing the network information to determine to which subscriber the information pertains, and supplying subscriber-specific network information to RTR 240. Upon initialization, Status Manager 225 first determines what Network Proxy Agents 230 are available. Status Manager 225 then invokes a copy of Poller 226 and of Trap Processor 224 for each available network proxy agent. Each Poller 226 first gathers network configuration information and network status information from its network proxy agent, who gathers network information from one or more switches in public network 130. Poller 226 also retrieves subscriber information from RTR 240. Poller 226 uses the subscriber information to analyze retrieved network information and to determine which network information pertains to which subscriber. Poller 226 then forwards subscriber-specific network information to RTR 240. After Poller 226 completes an initial retrieval of network information, Trap Processor 224 begins to monitor its network proxy agent for any traps that occur. Trap Processor 224 also retrieves subscriber information from RTR 240. If Trap Processor 224 detects a trap, it uses the retrieved subscriber information to determine which subscribers are affected by the trap and then forwards subscriber-specific trap information to RTR 240. In addition, Trap Processor 224 forwards the trap information directly to those subscribers which are affected by the trap. Trap Processor 224 can be configured to confirm the information in received traps which meet a variety of conditions before the trap information is forwarded to RTR 240 or to subscribers.

In addition to the initial determination of network information that is conducted by Poller 226, Poller 226 also retrieves updated network information on a periodic basis (e.g., once per day). Alternately, Poller 226 can be notified by its network proxy agent if a change has occurred in network configuration, or Poller 226 can be manually invoked by a user via Administrative User Interface 222. When Poller 226 is invoked, it again gathers current network information, uses the subscriber information to analyze the network information and to determine which network information pertains to which subscriber, and forwards either all or new subscriber-specific network information to RTR 240.

After RTR 240 has been initialized with subscriber information, general network status information, and subscriber-specific network information, RTR 240 can receive requests for current network information from Subscriber Manager Stations such as Subscriber 1 Manager Station 112 and Service Provider Stations such as Service Provider 1 Station 160. These requests can be transmitted in a variety of manners, such as via SNMP or HTTP. When RTR 240 receives a request for current network information from Subscriber 1 Manager Station 112, RTR 240 first verifies the identity of the subscriber, then identifies the service level of the subscriber, and finally sends current network information to that subscriber if the request is approved for processing. If the subscriber-specific information stored for that subscriber in RTR 240 is not sufficiently accurate (e.g., is not current), RTR 240 retrieves current network information for that subscriber from Network Proxy Agents 230. RTR 240 can also supply real-time network status information to Subscriber 1 Manager Station 122 if the Manager Station is capable of receiving unsolicited network status information. Upon receiving updated subscriber-specific network status information for Subscriber 1, RTR 240 can automatically forward such information to Subscriber 1 Manager Station 122. RTR 240 can similarly process requests from Service Provider Station 160 for current network status information for public network 130, and can similarly supply such real-time network status information to the Service Provider Station 160.

RTR 240 also writes log information regarding the operation of RTR 240 and MLM 150. For example, information on each request received and on each update to RTR 240 can be stored in log files. Alternately, only unusual situations such as detections of unauthorized information requests may be stored in a log file. Users of Service Provider Station 160 can retrieve the information from the log files via Administrative User Interface 222. Such users can also use Administrative User Interface 222 to access network status information in RTR 240, or alternately can view MIB data structures from RTR 240 with a MIB browser. The Log Manager 221 manages the logs by ensuring that constraints on the data in the logs (e.g., limits on log size or removal of data that is too old) are enforced.

Figure 3:
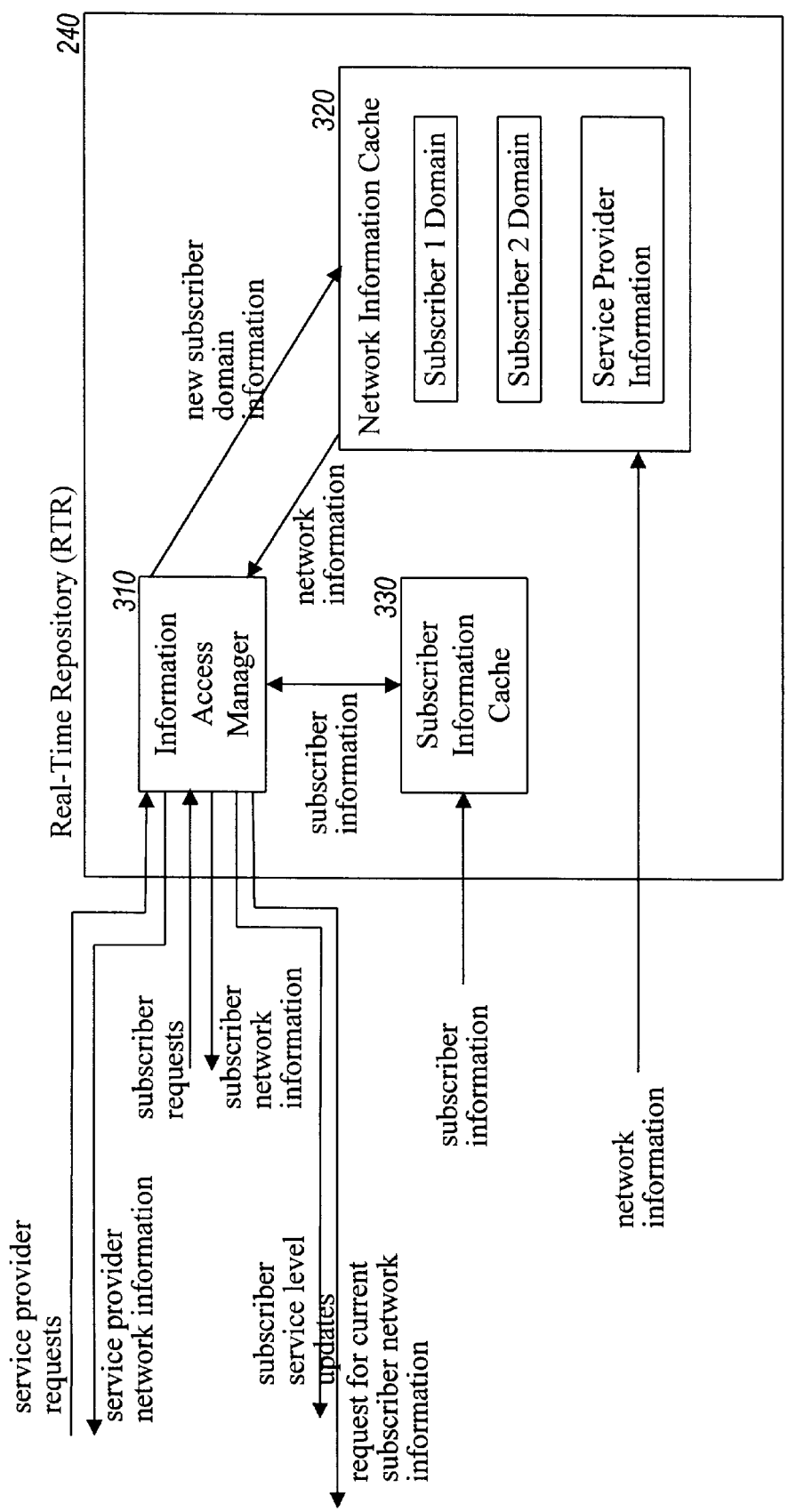
FIG. 3 is a block diagram illustrating an embodiment of the Real-Time Repository component of the MLM system.

FIG. 3 illustrates the components and information flow of RTR 240. Subscriber information received by RTR 240 is inserted into the Subscriber Information Cache 330, with the information stored separately by subscriber. Similarly, network information received by RTR 240 is inserted in the Network Information Cache 320 and stored separately by subscriber. Each subscriber has a separate subscriber domain within Network Information Cache 320, with the subscriber domain containing the subscriber-specific network information for that subscriber. Network Information Cache 320 also contains non-subscriber-specific network status information that will be supplied to service provider users.

Information Access Manager 310 processes the request from subscribers and service providers. When Information Access Manager 310 receives subscriber requests for current network information, Information Access Manager 310 retrieves subscriber information from Subscriber Information Cache 330 to verify subscriber identities and to determine subscriber levels of service. If the subscriber request is authorized, Information Access Manager 310 retrieves the subscriber-specific network information for the subscriber from the subscriber's domain in Network Information Cache 320 and sends the information to the subscriber. Information Access Manager 310 can also update subscriber information in Subscriber Information Cache 330 (e.g., when a request to modify a subscriber level of service is received and processed), and notify Network Information Cache 320 to create a subscriber domain for a new subscriber when information related to a new subscriber is received by RTR 240. Information Access Manager 310 will be described in greater detail below with regard to FIG. 10.

Figure 4:
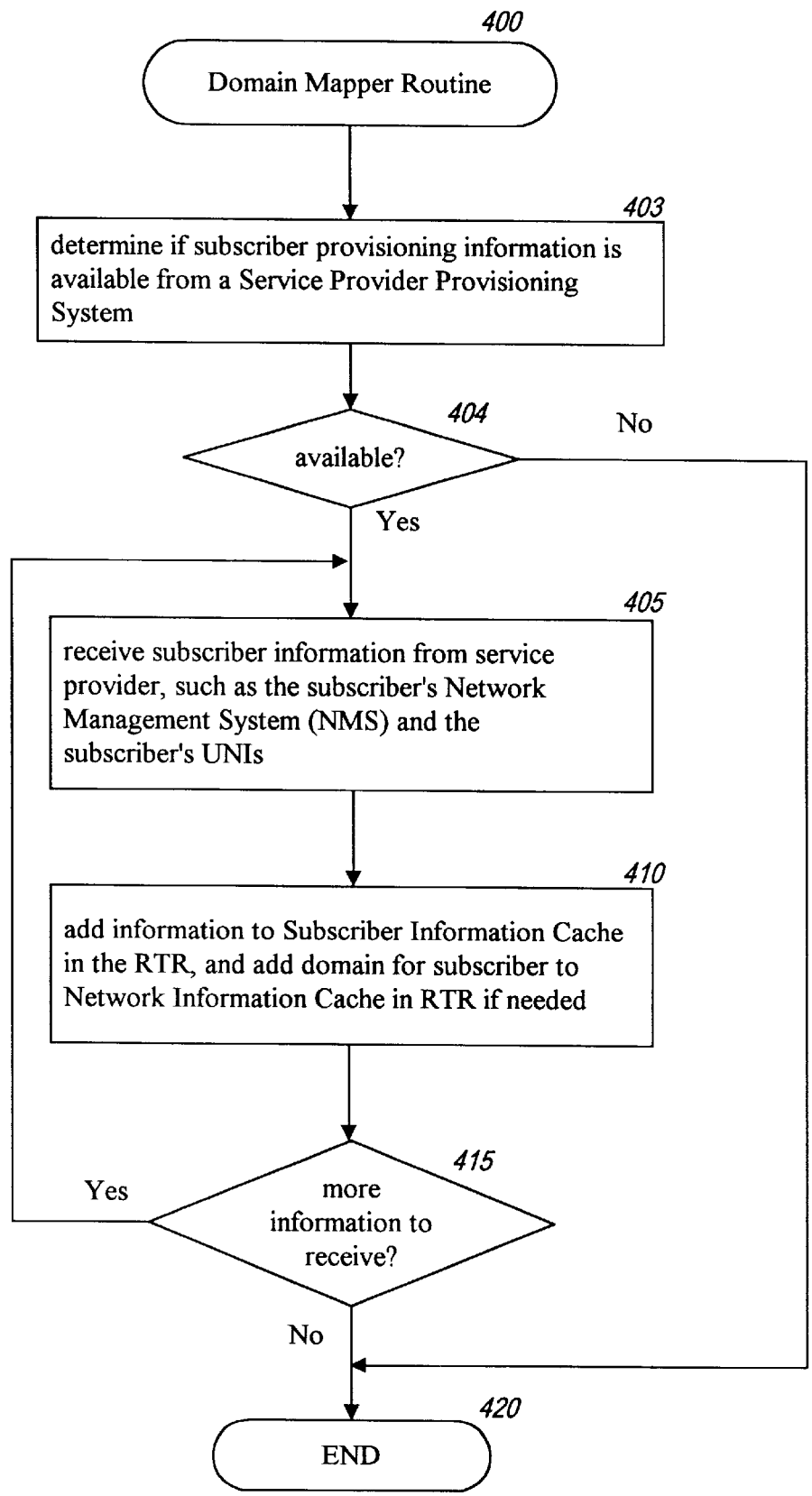
FIG. 4 is an exemplary flow diagram of a Domain Mapper routine employed by the MLM system.

FIG. 4 is an exemplary flow diagram for a Domain Mapper routine 400, which can be performed by Domain Mapper 223. When subscriber provisioning information is available from a service provider provisioning system, the Domain Mapper routine retrieves the subscriber information and supplies the information to the RTR. In step 403, the routine checks if subscriber provisioning information is available from a service provider provisioning system. If the routine determines in step 404 that the information is not available, the routine continues to step 420 and ends. If the subscriber provisioning information is available, however, the routine continues to step 405 where it retrieves the subscriber information from the service provider provisioning system. This subscriber provisioning information can include information such as the subscriber's NMS, the subscriber's UNIs, and the subscriber's levels of service. The routine continues to step 410, where the retrieved information is added to the Subscriber Information Cache in the RTR. In addition, if a new subscriber is identified, the subscriber domain before that subscriber is added to the Network Information Cache in the RTR. The routine then continues to step 415 where it determines if there is more subscriber provisioning information to receive. If so, the routine returns to step 405 to retrieve additional subscriber provisioning information. If there is not more subscriber provisioning information to receive, the routine continues to step 420 and ends.

Figure 5:
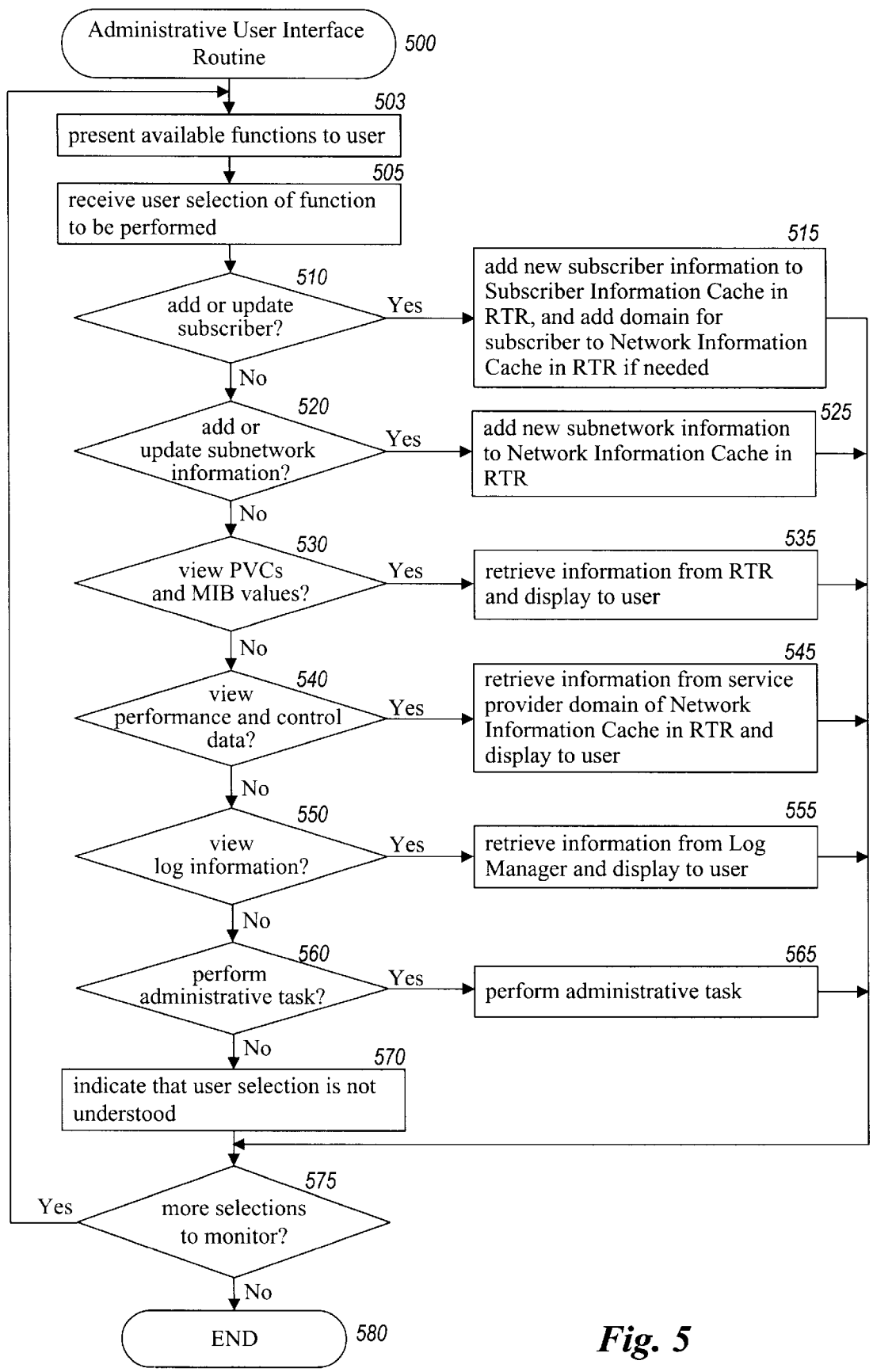
FIG. 5 is an exemplary flow diagram of the Administrative User Interface routine employed by the MLM system.

FIG. 5 is an exemplary flow diagram for an Administrative User Interface routine 500, which can be performed by Administrative User Interface 222. The Administrative User Interface routine is used by a service provider user, such as the service provider network administrator. The routine provides a variety of functionality to the user, allowing the user to select and perform various functions. The routine begins in step 503 where the routine presents the available functions to the user. The routine continues to step 505 where it receives the user selection of a function to be performed. In step 510, the routine determines if the user selected a function of adding or updating a subscriber. If so, the routine continues to step 515 where it adds the new subscriber information to the Subscriber Information Cache in the RTR. In addition, if a new subscriber has been added, the routine adds a subscriber domain for that subscriber to the Network Information Cache in the RTR. If the selected function was not to add or update a subscriber, the routine continues to step 520 where it determines if the selected function was to add or update the subnetwork information. Subnetworks can be defined for one or more devices on a network, such as all devices from a particular vendor or all devices of a particular type. If the selected function was to add or update the subnetwork information, the routine continues to step 525 where it adds the new subnetwork information to the Network Information Cache in the RTR. For example, the administrative user may specify a network proxy agent for a subnetwork. If the selected user function was not to add or update the subnetwork information, the routine continues to step 530 where it determines if the selected function was to view PVCs and MIB values. If so, the routine continues to step 535 where it retrieves the PVC and MIB information from the RTR and displays the information to the user. If the selected functionality was not to view PVCs and MIB values, the routine continues to step 540 where it determines if the selected functionality was to view network performance and control data for the service provider network. If so, the routine continues to step 545 where it retrieves the current network status information from the service provider domain of the network information cache in the RTR, and displays retrieved information to the user. If the selected functionality was not to view service provider performance and control data, the routine continues to step 550 where it determines if the selected functionality was to view log information. If so, the routine continues to step 555 where it retrieves the requested information from the log manager and displays it to the user. If the selected user function was not to view log information, the routine continues to step 560 where it determines if the user selected to perform an administrative task, such as adding or deleting service provider users. If so, the routine continues to step 565 where it performs the administrative task. If not, the routine continues to step 570 where it indicates to the user that the user selection was not understood. After steps 515, 525, 535, 545, 555, 565, or 570, the routine continues to step 575 to determine if there are more user selections to receive. If so, the routine returns to step 503, and if not, the routine ends at step 580.

Figure 6:
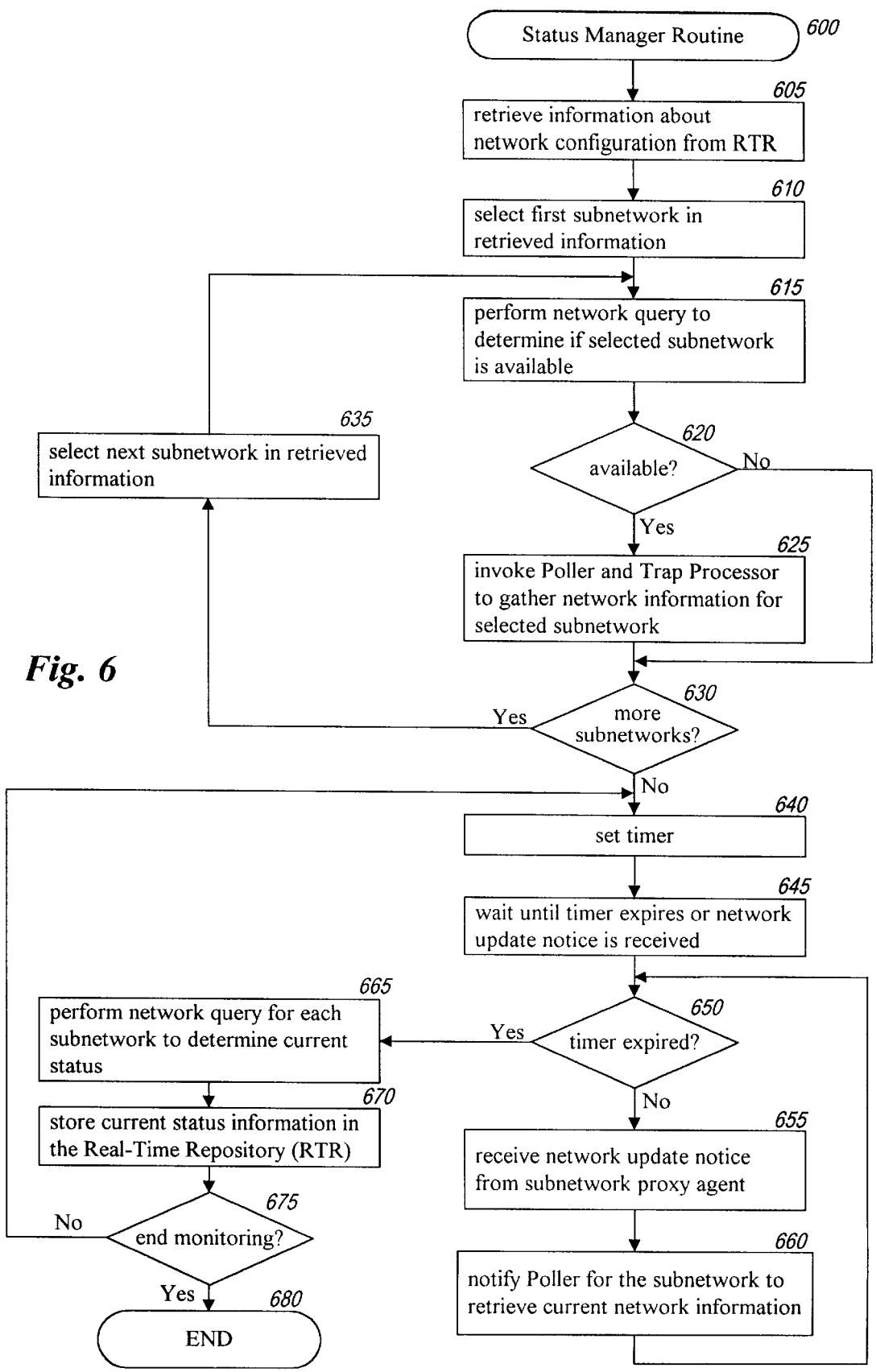
FIG. 6 is an exemplary flow diagram of the Status Manager routine employed by the MLM system.

FIG. 6 is an exemplary flow diagram for a Status Manager routine 600, which can be performed by Status Manager 225. The Status Manager routine is responsible for determining the availability of network proxy agents or switches, and invoking a Poller and Trap Processor for each subnetwork when the Status Manager routine is first initialized. The routine begins in step 605 where it retrieves information about network configuration from the RTR. The routine continues to step 610 where it selects a first subnetwork from the retrieved information. In step 615, the routine performs a network query to determine if the selected subnetwork or a network proxy agent for the subnetwork is available. If the selected subnetwork is determined to be available in step 620, the routine continues to step 625 where a Poller and Trap Processor are invoked to gather network information for the selected subnetwork. After step 625, or if the selected subnetwork was determined to be unavailable in step 620, the routine continues to step 630 to determine if there are more subnetworks from the retrieved information. If so, the routine continues to step 635 where it selects the next subnetwork, and then returns to step 615.

If the routine determines in step 630 that there are not more subnetworks in the retrieved information, the routine continues to step 640 where it sets a timer. In step 645 the routine waits until the timer expires or until it receives a notice that the network information needs to be updated. The routine continues to step 650 to determine if the timer expired, and if so, in step 665 the routine performs a new network query for each subnetwork to determine if the subnetwork is still available. The routine then continues to step 670 to store the current status information for each subnetwork in the RTR. The routine then determines in step 675 if the monitoring of the subnetworks should end. If so, the routine ends at step 680, and if not, the routine returns to step 640. If it is determined in step 650 that the timer did not expire, the routine continues to step 655 where it receives a network update notice from a proxy agent for a subnetwork. The routine then continues to step 660, where it notifies the Poller for that subnetwork to retrieve current network information. The routine then returns to step 645.

Figure 7:
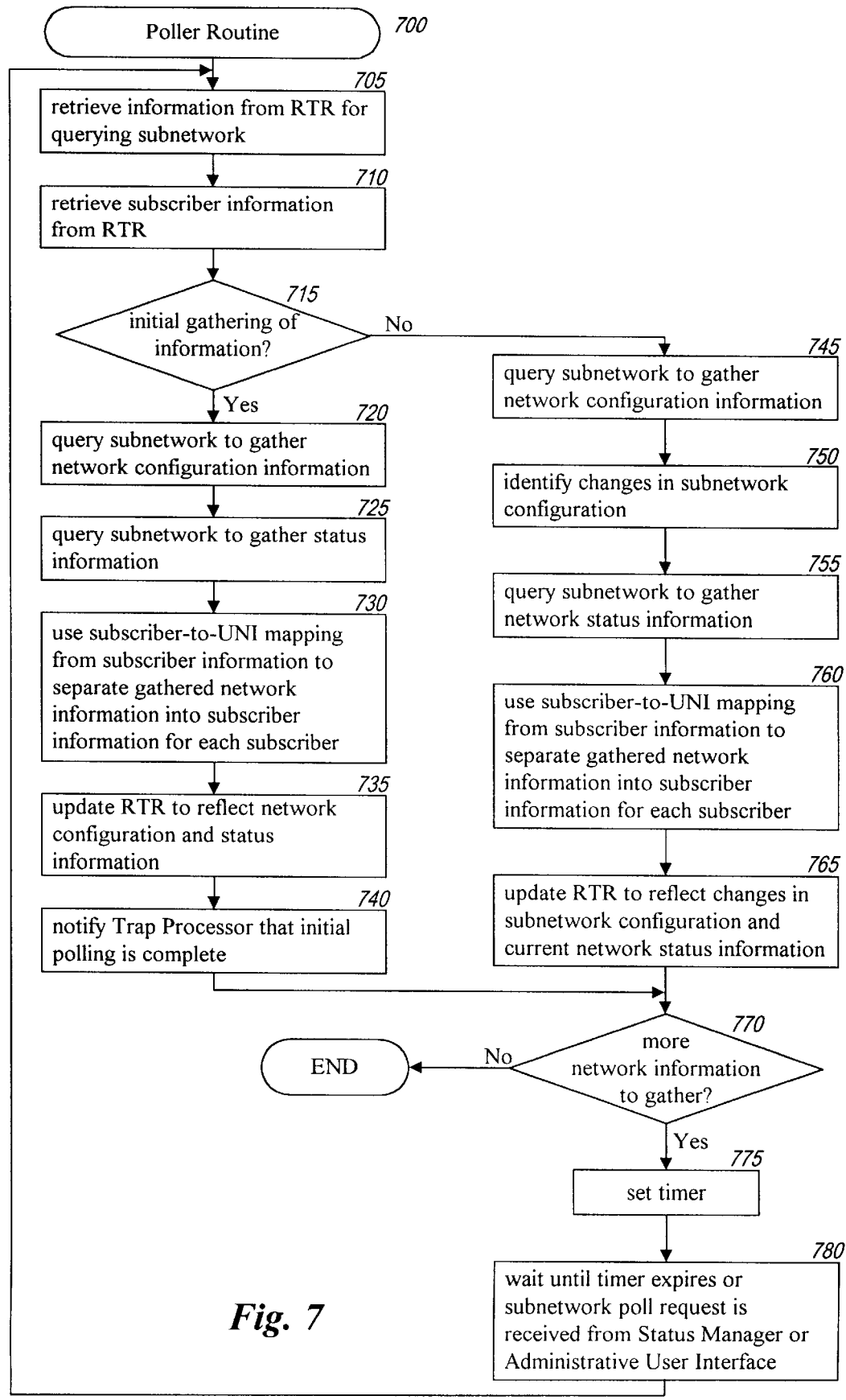
FIG. 7 is an exemplary flow diagram of the Poller routine employed by the MLM system.

FIG. 7 is an exemplary flow diagram for a Poller routine 700, which can be performed by Poller 226. The Poller routine is responsible for gathering network information for a particular subnetwork, analyzing the network information to determine to which subscribers the network information pertains, and updating the RTR with subscriber-specific network information. The routine begins in step 705 where it retrieves information from the RTR for querying its subnetwork, such as the subnetwork proxy agent or a network address for a subnetwork switch. The routine continues to step 710 where it retrieves subscriber information from the RTR. In step 715, the routine determines if it is engaged in an initial gathering of network information. If so, the routine continues to step 720 where it queries the subnetwork to gather network configuration information, such as the available UNIs and the connections between UNIs. The routine then continues to step 725, where it queries the subnetwork to gather network status information. The routine then continues to step 730 where it analyzes network information to determine one or more UNIs to which the network information relates, and uses a subscriber-to-UNI mapping to identify subscribers and PVCs which are related to the network information. The routine then continues to step 735, where it updates the RTR to reflect the subscriber-specific network configuration and status information. In step 740, the routine notifies the Trap Processor that the initial polling of information is complete. In step 770, the routine determines if there is more information to gather. If not, the routine ends at step 785. If there is more information to gather, the routine continues to step 775 where it sets a timer. In step 780, the routine waits until the timer expires or until the routine receives a request from the Status Manager or the Administrative User Interface to poll a subnetwork for network information. The routine then returns to step 705.

If the routine determined in step 715 that it is not engaged in the initial gathering of the information, the routine continues instead to step 745 where it queries the subnetwork to gather network configuration information. The routine then continues to step 750 where it identifies changes in the subnetwork information from the previous gathering of information. In step 755, the routine queries the subnetwork to gather network status information. In step 760, the routine again uses the subscriber-to-UNI mapping to separate the gathered network information into subscriber-specific network information for each subscriber. The routine then continues to step 765 where it updates the RTR so that it reflects the changes in the subscriber-specific network information with the current network status information. The routine then continues to step 770. Those skilled in the art will appreciate that network information other than configuration and status information can be received (e.g., performance data and service level agreement data), and that processing the received network information may require additional steps in the case of PVCs that are not composed of a single channel or that are not owned by a single subscriber over a single service provider's public network comprised of a single vendor's hardware.

Figure 8:
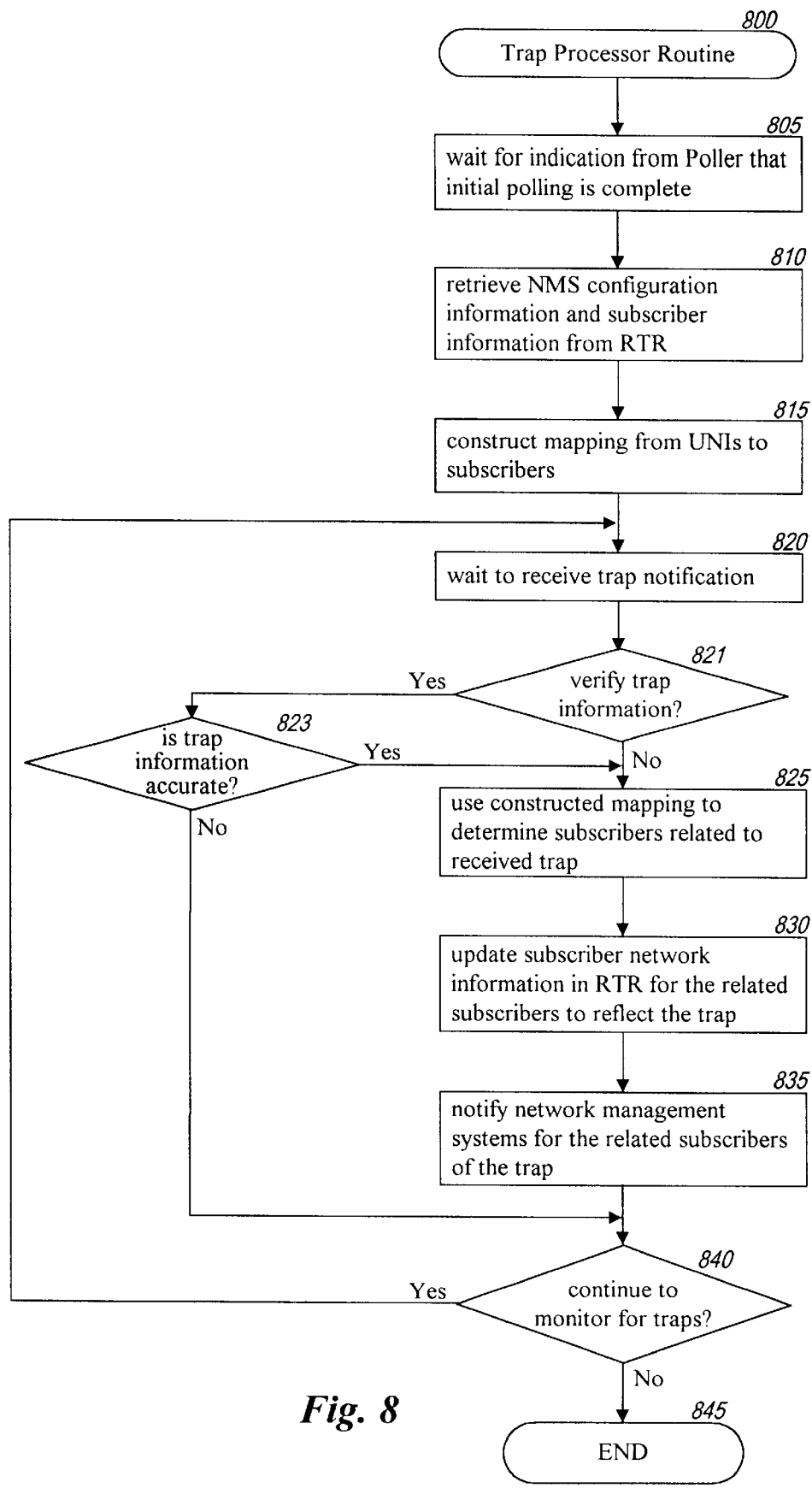
FIG. 8 is an exemplary flow diagram of the Trap Processor routine employed by the MLM system.

FIG. 8 is an exemplary flow diagram for a Trap Processor routine 800, which can be performed by Trap Processor 224. The Trap Processor routine is responsible for monitoring a subnetwork, determining when traps occur which indicate changes in network status, identifying the subscribers to which the trap information is relevant, updating the RTR to reflect the subscriber-specific changes, and notifying the affected subscribers of the trap. The routine begins in step 805 where it waits for an indication from the Poller that the initial gathering of network information is complete. In step 810, the routine retrieves subscriber information and NMS configuration information for that subscriber from the RTR. In step 815, the routine constructs a mapping from UNIs to subscribers. In step 820, the routine waits to receive a trap notification from a network proxy agent for the subnetwork. In step 821, the routine has received a trap notification, and the routine determines if the trap information needs to be verified. If network proxy agents are known to provide erroneous or redundant information in certain circumstances, the Trap Processor can be configured to verify trap information that is received before it is processed. If the trap information is to be verified, the routine continues to step 823 where it determines if the trap information is accurate. If so, or if it was determined in step 821 that the trap information did not need to be verified, the routine continues to step 825. If it is determined in step 823 that the trap information is not accurate, the routine continues to step 840. In step 825, the routine uses the constructed mapping to determine the subscribers related to the received trap. In step 830, the routine updates the subscriber network information on the RTR for the related subscribers so that it reflects the trap. In step 835, the routine notifies the network management systems of the affected subscribers of the trap. In step 840, the routine determines if it should continue to monitor for additional traps. If so, the routine returns to step 820, and if not, the routine ends at step 845. Those skilled in the art will appreciate that other events than traps can be processed, and that certain traps could have special processing subroutines.

Figure 9:
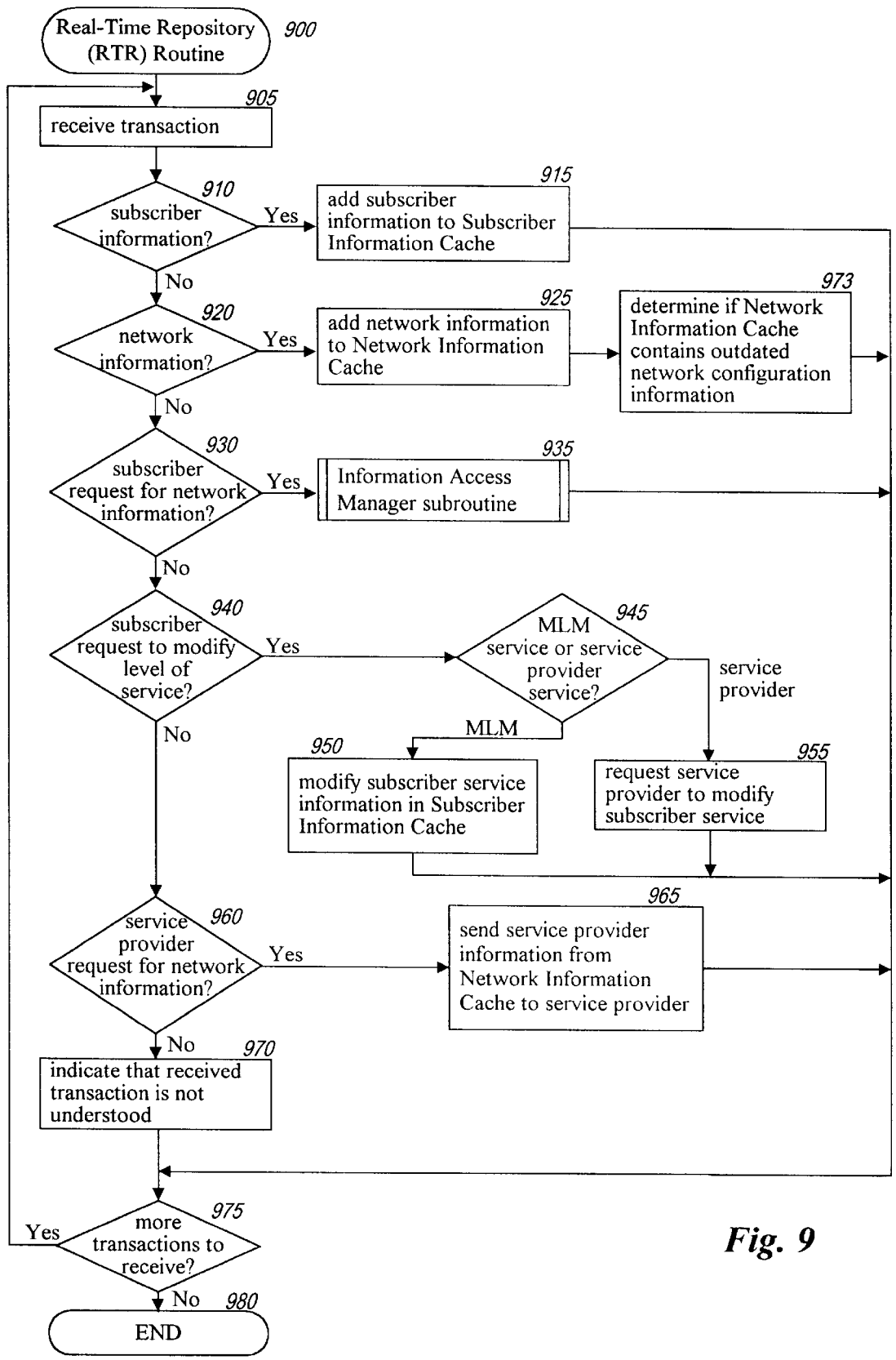
FIG. 9 is an exemplary flow diagram of the Real-Time Repository routine employed by the MLM system.

FIG. 9 is an exemplary flow diagram of a Real-Time Repository (RTR) routine 900, which can be performed by RTR 240. The RTR routine acts as a transaction-processing front-end for an intelligent database that holds subscriber information and subscriber-specific network information, using that information to respond to requests for information and for modifications of service levels. The routine begins at step 905 where it receives a transaction. In step 910, the routine determines if the transaction includes subscriber information. If so, the routine continues to step 915 where it adds the subscriber information to the Subscriber Information Cache. If not, the routine continues to step 920 where it determines if the transaction includes network information. If so, the routine adds the network information to the Network Information Cache in step 925 and continues to step 973. In step 973, the routine determines if the Network Information Cache contains outdated network configuration information for switches or other network devices or entities that are no longer available. If such outdated information is found, the routine removes the outdated information from the Network Information Cache and the RTR. If the transaction is determined to not include network information in step 920, the routine continues to step 930 where it determines if the transaction is a subscriber request for network information. If so, the routine invokes the Information Access Manager subroutine in step 935. If not, the routine continues to step 940 where it determines if the transaction is a subscriber request to modify a level or type of service. If so, the routine continues to step 945 where it determines if the level of service to be modified is an MLM service level or a service provider service level. If it is an MLM service level, the routine continues to step 950 where it modifies the subscriber service information in the Subscriber Information Cache. If the request is determined in step 945 to be a modification for a service provider level of service, the routine continues to step 955 where the request to modify the subscriber level of service is forwarded to a service provider manager station. If it is determined in step 940 that the transaction is not a subscriber request to modify a level of service, the routine continues to step 960 where it determines if the transaction is a service provider request for network information. If so, the routine continues to step 965 where it retrieves the network status information for the service provider from the Network Information Cache and sends the information to the requesting service provider. If not, the routine continues to step 970 where it indicates that the received transaction is not understood. After step 915, 973, 935, 950, 955, 965 or 970, the routine continues to step 975, where it determines if there are more transactions to receive. If so, the routine returns to step 905 to receive another transaction, and if not, the routine ends in step 980.

Figure 10:
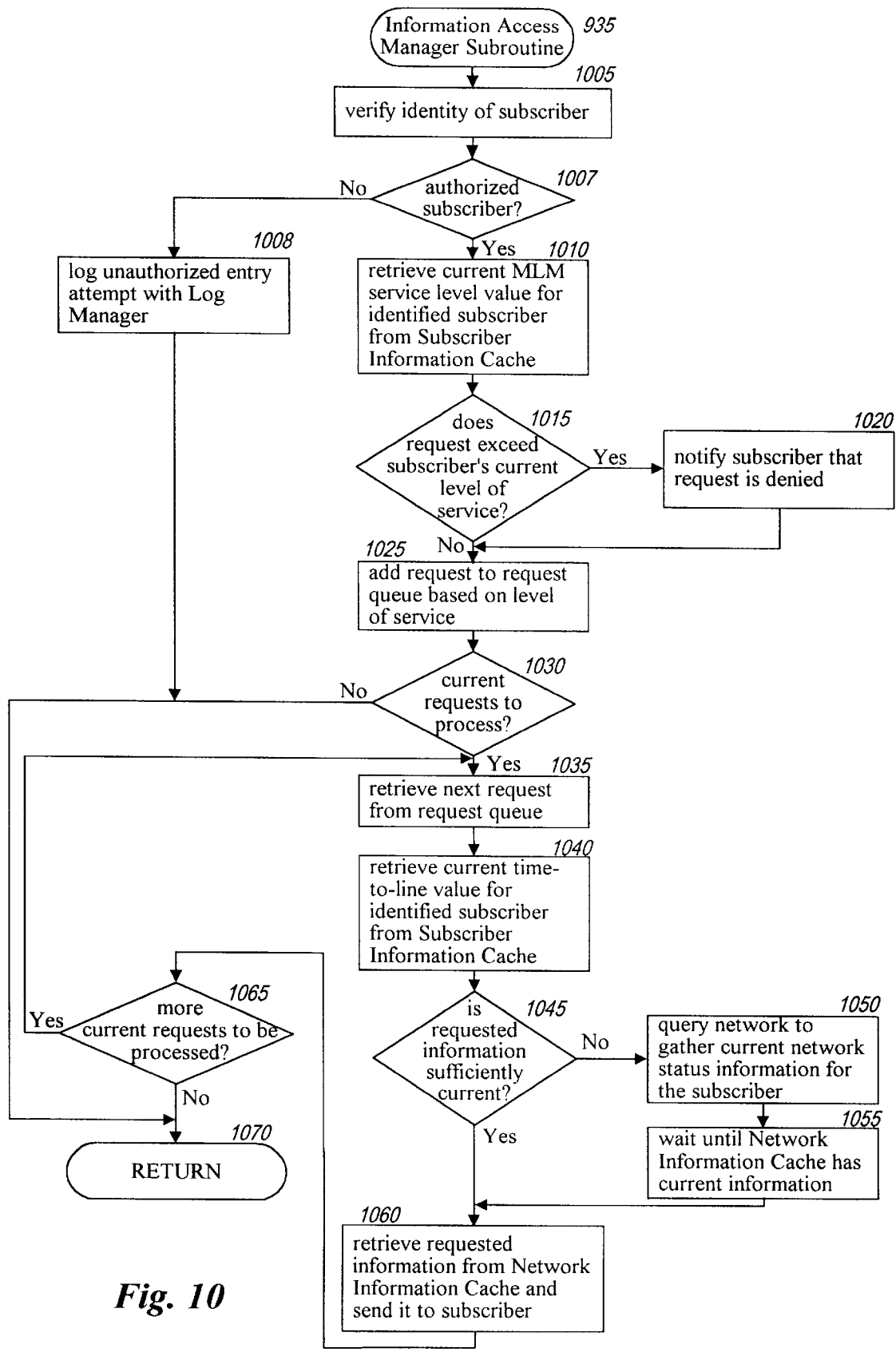
FIG. 10 is an exemplary flow diagram of the Information Access Manager subroutine employed by the MLM system.

FIG. 10 is an exemplary flow diagram of the Information Access Manager subroutine 935, which can be performed by Information Access Manager 310. The Information Access Manager subroutine handles requests from subscribers for network information by verifying the identity of the subscriber, determining whether the request is authorized under the subscriber's current level of service, and processing the request in an order based on the subscriber's level of service so that current subscriber-specific network information is returned to the requesting subscriber. The subroutine begins in step 1005 where it verifies the identity of the subscriber. This can be accomplished in a variety of ways, such as via passwords, public key encryption, or biometric means. The subroutine continues to step 1007 where it determines if subscriber authorization to make the request has been verified. If not, the subroutine continues to step 1008 where it logs the unauthorized entry attempt with the Log Manager, and then continues to step 1070 and returns. If the subscriber is determined to be authorized in step 1007, the subroutine continues to step 1010 where it retrieves the current MLM service level value for the identified subscriber from the Subscriber Information Cache. The subroutine then continues to step 1015 where it determines if the request exceeds the subscriber's current level of service. If so, the subroutine continues to step 1020 where it notifies the subscriber that the request is denied. If the request does not exceed the current level of service, the subroutine continues to step 1025 where it adds a request to a request queue based on the subscriber's level of service.

After step 1025 or step 1020, the subroutine continues to step 1030 to determine if there are current requests in the request queue to process. If not, the subroutine continues to step 1070 and returns. If there are current requests to process, the subroutine continues to step 1035 where it retrieves the next request from the request queue. In step 1040, the subroutine retrieves the current time-to-live value for the identified subscriber from the subscriber information cache. In step 1045, the subroutine uses the time-to-live value to determine if the requested subscriber-specific network information is sufficiently current. If not, the subroutine continues to step 1050 where it queries the network to gather current network status information for the subscriber. The subroutine continues to step 1055 to wait until current subscriber-specific network information for the subscriber has been added to the Network Information Cache. After step 1055, or if the requested information was determined to be sufficiently current in step 1045, the subroutine continues to step 1060 where it retrieves the requested subscriber-specific network information from the Network Information Cache, and supplies the information to the requesting subscriber. The subroutine then continues to step 1065 where it determines if there are more requests in the request queue that are currently ready to be processed. If so, the subroutine returns to step 1035, and if not, the subroutine ends at step 1070.

Figure 11:
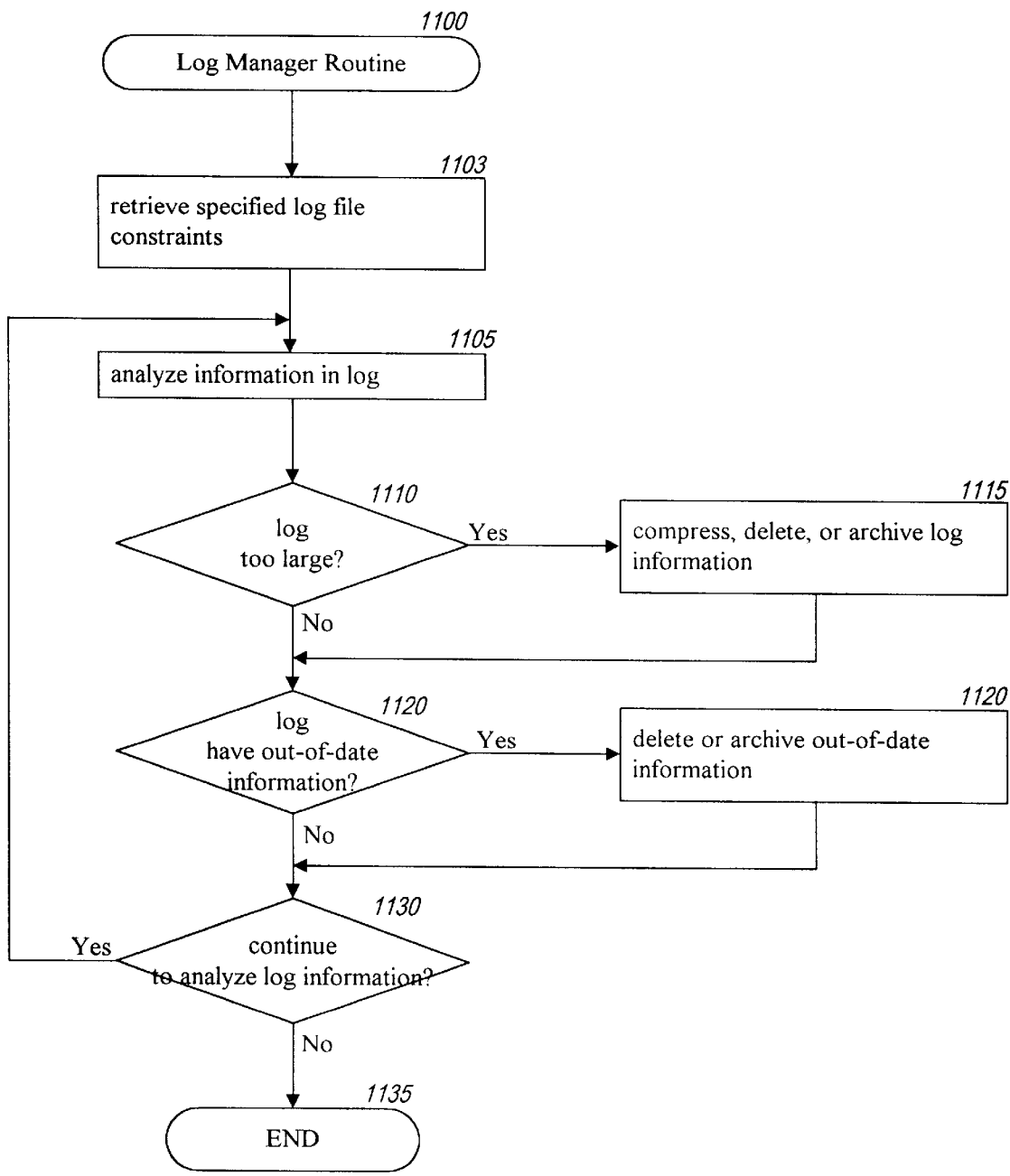
FIG. 11 is an exemplary flow diagram of the Log Manager routine employed by the MLM system.

FIG. 11 is an exemplary flow diagram for a Log Manager routine 1100, which can be performed by Log Manager 221. The Log Manager routine is responsible for maintaining one or more log files to ensure that defined constraints on log information are maintained. For example, service provider users may specify a maximum period of time for data to stay in a log file. Data older than the specified time can be deleted or archived. Those skilled in the art will appreciate that a variety of log constraints can be imposed. The routine begins in step 1103 where it retrieves specified log file constraints that determine how the log files and their information is maintained. In step 1105, the routine analyzes information in one or more log files. In step 1110, the routine determines if an analyzed log file is too large based on specified log file constraints or based on limits in the storage space for the log file. If so, the routine continues to step 1115 to either compress the log file, or to delete or archive some of the log information, depending on specified log constraints. After step 1115, or if an analyzed log file is not determined to be too large in step 1110, the routine continues to step 1120 where it determines if an analyzed log file has information that is older than a specified deadline. If so, the routine continues to step 1125 to delete or archive the out-of-date information. After step 1125, or if any analyzed log file is not determined have out-of-date information in step 1120, the routine continues to step 1130 to determine whether to continue to analyze and manage log information. If so, the routine returns to step 1103, and if not, the routine ends at step 1135.

As discussed previously, MIB data structures can be used to gather network information. Following is an example abstract of a CNM-specific MIB data structure for use by the MLM system. This abstract shows the Object ID (OID) that is used by the MLM for fast access to the MIB hierarchy. Also shown are the human-readable name for each OID and its data type. There are both individual objects and tables (which correspond to tables in a relational database).

There are two parts to the MIB. The first part shows the part of standard MIBs (RFC 1213, RFC 1573 and RFC 1604) that is used in the MLM. This represents the data that is available to subscribers. The second part is a proprietary enterprise-specific MIB that represents the data stored to control the MLM and to present the data to the service provider administrators.

Although specific embodiments of, and examples for, the invention are described herein for illlustrative purposes, various equivalent modifications are possible within the scope of the invention, as those skilled in the relevant are will recognize. The teachings provided herein of the invention can be applied to other types of interconnected networks, including networks that do not use the SNMP protocol, that are not based on a frame relay packet switching technology, and that do not use MIB data structures.

These and other changes can be made to the embodiments of the invention in the light of the above detailed description. In general, in the following claims, the terms used should not be construed to limit the invention to the specific embodiments disclosed in the specification, but should be construed to include any network information management system that operates under the claims to provide network information for monitoring, measuring, and manipulation purposes. Accordingly, the invention is not limited by the disclosure, but instead its scope is to be determined entirely by the following claims.

What is claimed is:

1. A computer-implemented method for securely monitoring concurrent flows of information on a public network of computers, each of a plurality of users having on the public network a flow of private information originating from a private source computer of the user and arriving at a private destination computer of the user, the method comprising the steps of:

identifying the private source computer and the private destination computer for each of the plurality of users;

retrieving network status information for the public network that includes a current status of each of the public network computers;

gathering information about private information flows on the public network by repeatedly, receiving network status information for the public network that includes a current status of each of the public network computers;

receiving network operation information for the public network that includes data about information traveling from source computers through the public network to destination computers; and for each user, analyzing the received network operation information to identify the received data about information whose source or destination computer is the private source computer or the private destination computer of the user; and storing the identified data in a storage location specific to the user; and sending to each user recently received network status information and recently stored identified data from the storage location specific to the user.

2. The method of claim 1 wherein each flow of private information comprises a plurality of information packets each traveling from a source computer to a destination computer, and wherein the received network operation information data includes summaries of a total number of information packets sent and a total number of information packets received by each public network computer.

3. The method of claim 2 wherein the public network is a frame relay network and wherein the received network operation information summaries include instantiation of Management Information Base (MIB) data structures.

4. The method of claim 1 wherein each user has a pre-defined virtual connection through the public network between the private source computer and the private destination computer of the user, and wherein the flow of private information for the user travels through the public network according to specified parameters for the pre-defined virtual connection.

5. The method of claim 4 wherein bandwidth is a specified parameter of a pre-defined virtual connection, wherein the flow of information for a user attempts to exceed the bandwidth of the pre-defined virtual connection for the user, wherein recently stored identified data sent to the user identify the attempt to exceed the bandwidth, and including the steps of:

receiving from the user a request to increase the bandwidth of the pre-defined virtual connection for the user; and increasing the bandwidth of the pre-defined virtual connection for the user.

6. The method of claim 5 wherein the attempt to exceed the bandwidth lasts for a non-transitory period of time, wherein the user is notified of the attempt to exceed the bandwidth in real-time while the attempt persists, and wherein the increasing of the bandwidth occurs in real-time so that the flow of information for the user no longer exceeds the bandwidth of the pre-defined virtual connection for the user.

7. A computer-readable medium containing instructions for controlling a computer system to securely monitor concurrent flows of information on a public network of computers, each of a plurality of users having on the public network a flow of private information originating from a private source computer of the user and arriving at a private destination computer of the user, the monitoring such that each user can monitor only the flow of private information for the user, by:

identifying the private source computer and the private destination computer for each of the plurality of users;

retrieving network status information for the public network that includes a current status of each of the public network computers;

gathering information about private information flows on the public network by repeatedly, receiving network status information for the public network that includes a current status of each of the public network computers;

receiving network operation information for the public network that includes summaries about information traveling from source computers through the public network to destination computers; and for each user, analyzing the received network operation information to identify the summaries about information whose source or destination computer is the private source computer or the private destination computer of the user; and storing the identified summaries in a storage location specific to the user; and sending to each user recently received network status information and recently stored identified summaries from the storage location specific to the user.

8. A computer system for securely monitoring concurrent flows of information on a public network of computers, each of a plurality of users having on the public network a flow of private information originating from a private source computer of the user and arriving at a private destination computer of the user, the monitoring such that each user can monitor only the flow of private information for the user, comprising:

an initializer for identifying the private source computer and the private destination computer for each of the plurality of users;

a network information poller for gathering information about private information flows on the public network by repeatedly receiving network status information for the public network that includes a current status of each of the public network computers, by repeatedly receiving network operation information for the public network that includes summaries about information traveling from source computers through the public network to destination computers, and by repeatedly analyzing the received network operation information for each user to identify the summaries about information whose source or destination computer is the private source computer or the private destination computer of the user; and a network information repository for storing the identified private source computer and the identified private destination computer for each of the plurality of users, and for storing the identified summaries for each user in a storage location specific to the user.

* * * * *